Sept. 13, 1966 P. P. BLOZIS 3,272,030
COMBINED ENGINE THROTTLE AND TRANSMISSION CONTROL MEANS
Filed March 5, 1964 4 Sheets-Sheet 1
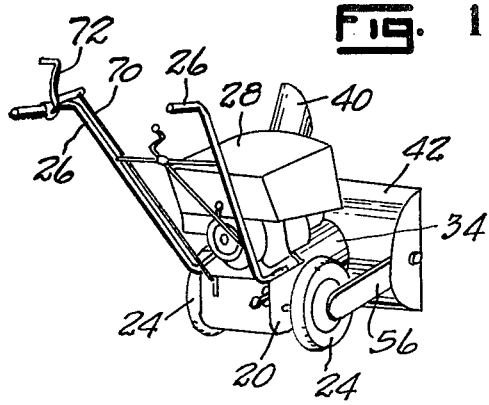
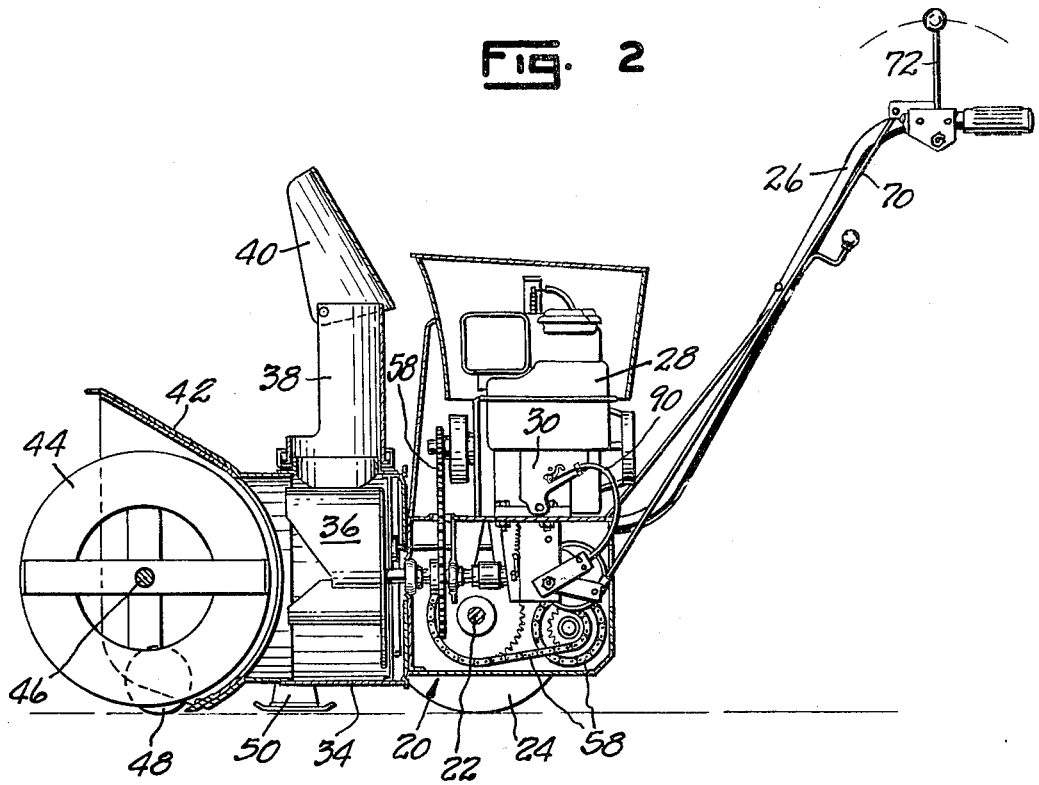
INVENTOR.
PETER P. BLOZIS
BY
ATTORNEY

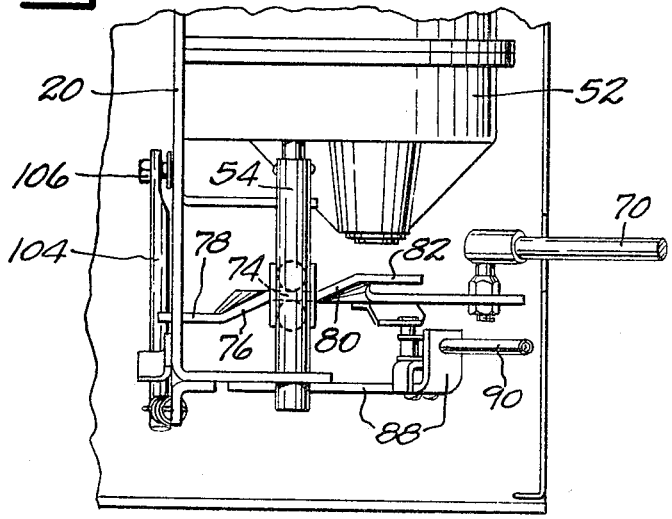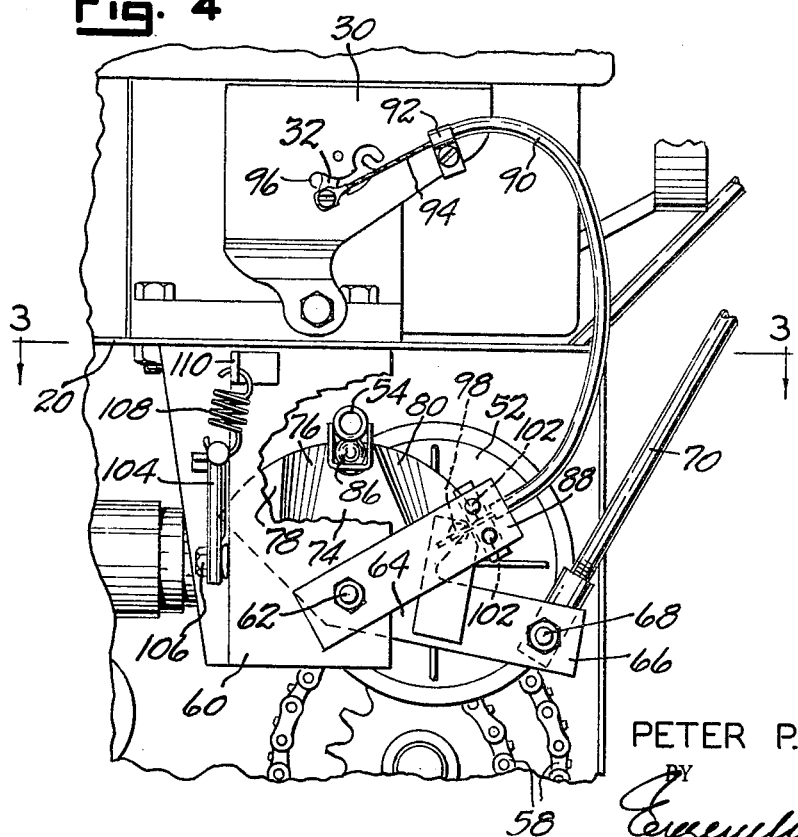

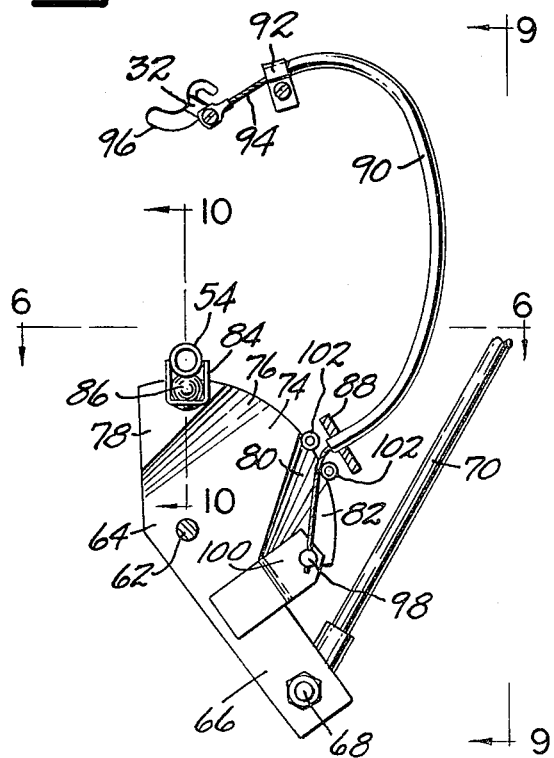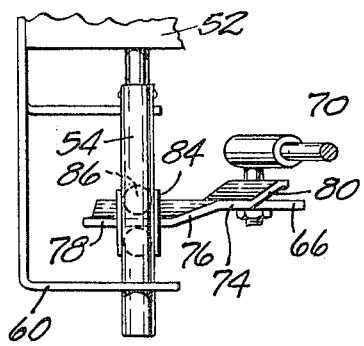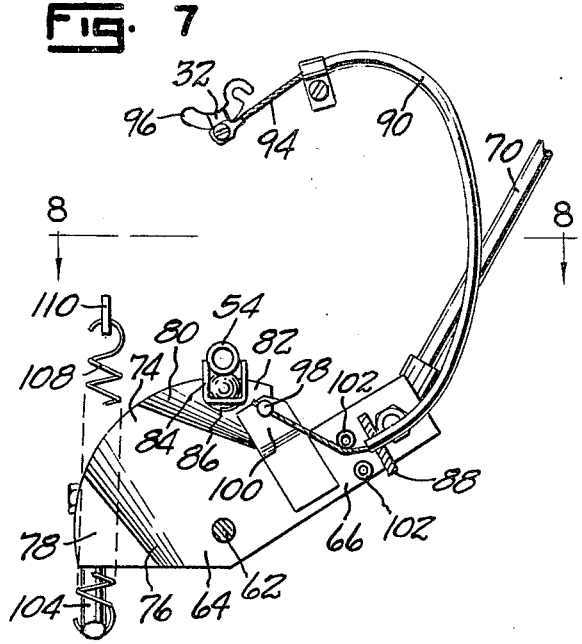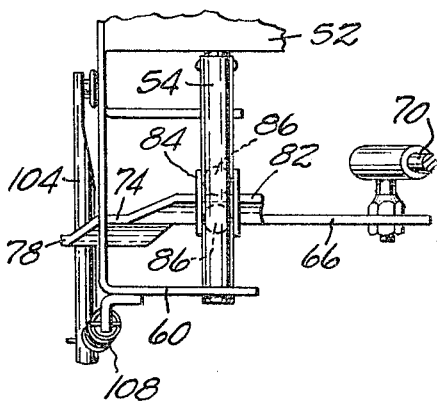

Sept. 13, 1966 P. P. BLOZIS 3,272,030
COMBINED ENGINE THROTTLE AND TRANSMISSION CONTROL MEANS
Filed March 5, 1964 4 Sheets-Sheet 4

INVENTOR.
PETER P. BLOZIS
BY
ATTORNEY

United States Patent Office 3,272,030
Patented Sept. 13, 1966

3,272,030
COMBINED ENGINE THROTTLE AND TRANSMISSION CONTROL MEANS
Peter P. Blozis, Michigan City, Ind., assignor, by mesne assignments, to Hahn, Inc., a corporation of Indiana
Filed Mar. 5, 1964, Ser. No. 349,574
6 Claims. (Cl. 74—472)

This invention relates to improvements in controls for engine driven devices with reversible drive transmissions, and more particularly to vehicles or devices, such as snow blowers, which have driven snow-dislodging and discharging devices and power-driven supporting wheels.

The primary object of this invention is to provide a control for devices of this character operable by manipulating one control lever to effect control of both an engine throttle and a reversing drive transmission.

A further object is to provide a device of this character wherein a control lever actuates a cam to swing the same through a predetermined arc, whereby to act upon a drive transmission to shift the same in a range including both "forward," "neutral" and "reverse."

A further object is to provide a device of this character having lever actuated transmission controlling means to which is connected an engine throttle in such a manner that the throttle automatically operates to produce low speed operation in reverse setting, idling operation in neutral setting, and full speed selectively at forward setting of the drive transmission.

A further object is to provide a device of this character wherein a transmission controlling cam moves between roller elements rotatively confined in a cage carried by the shaft of the drive transmission mechanism to minimize frictional resistance to controlling operation of the device.

A further object is to provide a device of this character wherein the throttle and transmission control means are so correlated to a unitary control member as to slightly accelerate the engine to produce slight gear rotation before the gears of the transmission are brought to meshing engagement, so that a "synchro-mesh" shifting is obtainable.

A further object is to provide a unitary control element for operating the drive transmission and throttle of a device of this character, wherein a cam is utilized having a portion which provides a "dwell" at the neutral position so as to cause pause in the movement of the drive transmission between forward and reverse positions even if the operator does not pause at a neutral position.

A further object is to provide a device of this character wherein a unitary control effects operation of both the drive transmission and the throttle of the device, and in which a "dead man's" control is associated with mechanism while the same is at reverse setting of the drive transmission, so as to permit the control to be moved to neutral position by spring tension in the event of release of the control mechanism by the operator.

Other objects will be apparent from the following specification.

In the drawings:

FIG. 1 is a rear perspective view of a snow blower utilizing my new control;

FIG. 2 is an enlarged side view of the control mechanism applied to a snow blower of which parts are broken away;

FIG. 3 is a fragmentary enlarged detail plan view taken on line 3—3 of FIG. 4;

FIG. 4 is an enlarged fragmentary side elevational view of the control mechanism illustrating the same in neutral position;

FIG. 5 is a fragmentary view illustrating the parts of the control in forward drive transmission setting and at high speed throttle setting;

FIG. 6 is a view taken on line 6—6 of FIG. 5;

FIG. 7 is a view similar to FIG. 5 but illustrating the position of the parts in reverse drive transmission setting;

FIG. 8 is a fragmentary transverse sectional view taken on line 8—8 of FIG. 7;

Figure 9:
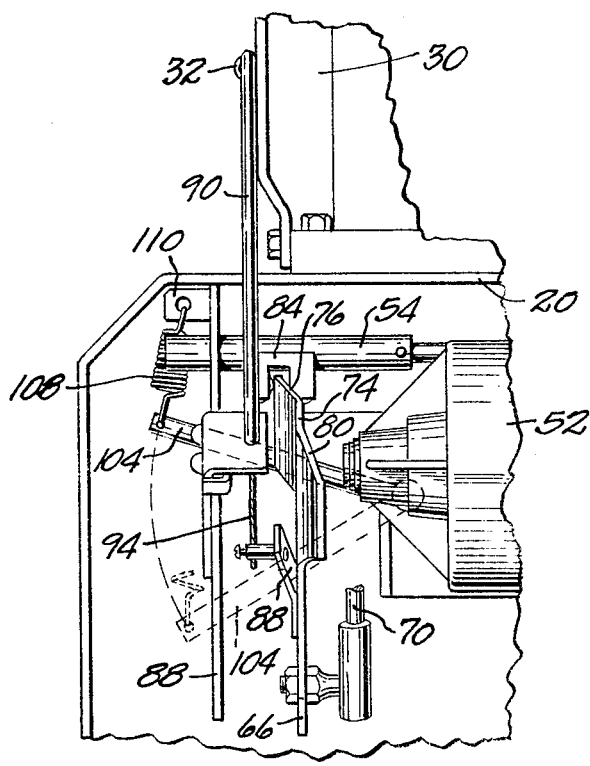
FIG. 9 is a rear elevational view taken on line 9—9 of FIG. 5.

Referring to the drawings which illustrate the preferred embodiment of the invention, the numeral 20 designates a frame or chassis of a vehicle supporting an axle 22, upon which are mounted supporting wheels 24. The chassis has handlebars 26 extending upwardly and rearwardly therefrom by means of which the device is guided and controlled. An internal combustion engine 28 is mounted upon the chassis within an engine housing, and the carburetor 30 controls the supply of fuel to the engine 28, through a shiftable throttle member 32.

The chassis is provided with a fan housing 34 intermediate the length thereof, within which is rotatably mounted a blower impeller or fan 36 which preferably rotates about a longitudinally forwardly extending axis. The fan housing has a discharge chute 38 into which the impeller delivers snow, and upon the free end of the chute 38 is mounted adjustably a discharge spout 40. Any suitable means (not shown) may be provided for varying the angular disposition of the chute 38 and spout 40 which preferably revolve about the axis of the chute 38 incident to bodily swinging of that chute from right to left. Forwardly of the fan housing 34 is positioned an auger housing 42 open at its front and at its bottom and communicating with the fan housing. An auger member 44 is rotatable in the housing 42 on a shaft or axis 46 transverse of the vehicle. An auger roller 48 or wheel may be provided at one or both sides of the auger housing 42 to support the auger 44 at a selected elevation above the supporting surface. If desired, the chassis may also be provided with a skid 50 to control the vertical position of the auger and associated parts during the operation of the vehicle.

A reversible drive transmission 52 is carried by the chassis 20. The transmission may be either of the single-speed or two-speed reversing type, and has a neutral position, a forward position and a reverse position or setting, as determined by the setting of shiftable control member 54. The transmission 52 preferably has a chain and sprocket drive connection with the driving axle 22, the auger and the impeller which is of any suitable character. The chain drive to the auger may be enclosed within an auger drive housing 56. It will be understood that a suitable centrifugal or other clutch (not shown) may be provided in the drive train between the engine and the driven parts. The drive connection may include the drive chains 58.

The chassis 20 may include suitable bracket means 60 which is positioned adjacent to the drive transmission 52 and the carburetor 30. The bracket 60 carries a shaft 62 upon which is rockably mounted a cam plate 64. Cam plate 64 is preferably in the shape of a segment of a circle and has projecting therefrom a substantially radial arm 66. Cam arm 66 has pivoted connection at 68 with an elongated upwardly extending actuator rod 70 which extends adjacent to one of the handlebars 26 which mounts a control lever assembly 72 adjacent to one of the hand grip portions of a handlebar and may be pivoted relatively thereto between a plurality of operative control positions.

Figure 10:
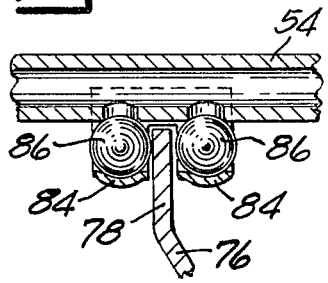
FIG. 10 is an enlarged fragmentary detail sectional view taken on line 10—10 of FIG. 5.

The cam 64 is preferably a segmental plate having a central flat radial portion 74 in one plane, an inclined or angular part 76 extending in one direction from the central part 74, a cam end part 78 substantially parallel to and offset from part 74, an oppositely extending angular cam part 80 and a second cam part 82 substantially parallel to and offset from central cam part 74. The cam plate 64 extends between opposed parts 84 of a bifurcated cage unit enclosing rollers 86 engageable with the cam plate, as best seen in FIG. 10. Roller cage 84 is carried by the control shaft 54. It will be observed that the spacing between the transmission control shaft 54 and the shaft 62 upon which the cam 64 rotates, is slightly greater than the radius of the segmental cam plate and that the rollers 86 engage opposite surfaces of the cam plate in all operative adjustments of the cam 64 between the respective limits of operation illustrated in FIGS. 5 and 7, at which the cam rollers engage the cam parts 78 and 82, respectively.

It will be observed that the position at which the rollers 86 engage the cam 64 is determined by the adjustment of the control lever 72 and the position of the actuator rod 70 controlled thereby. Thus, assuming that the control lever is positioned in a substantially vertical or upright position when the cam is positioned in neutral position as shown in FIG. 4, with rollers 86 engaging cam part 74, forward movement of the control lever 72 will push downwardly upon the actuator rod 70 to shift the control cam to the FIG. 5 position for forward drive movement or actuation of the transmission. Similarly, a rearward pull upon the control lever 72 will pull upwardly upon the actuator rod 70 and swing the control cam 64 to the position shown in FIG. 7, at which the transmission is adjusted for reverse operation.

The bracket 60 mounts an arm 88. An elongated flexible tube 90 is secured at one end thereof on the bracket arm 80. The opposite end of the tube 90 is fixedly anchored to the carburetor housing 30 by means of a clip 92 or other fastening member. A flexible cable 94 is secured at one end to the throttle member 32 of the carburetor, which throttle member is normally spring-urged by spring means (not shown) to a limit position which is an idling position and which is located at one end of an elongated slot or opening 96 in the housing of the carburetor 30. The cable 94 extends through the flexible tube 90 and its opposite end is secured at 98 to a part 100 carried by the cam 64. The securing point 98 is spaced from the axis of the shaft 62 a distance substantially equal to the spacing between the axis of the shaft 62 and the centers of the rollers 86. The bracket arm 88 carries a pair of rollers 102 spaced apart to permit free passage of the cable 94 therebetween adjacent to but spaced from the end of the flexible tube 90.

When the control mechanism is located at neutral position, as illustrated in FIG. 4, the connection 98 between the end of the cable 94 and the cam is located adjacent to the guide rollers 102 and only a small part of the cable need project from the tube 90 at that end, thereby permitting endwise movement of the cable 94 by the spring-urged throttle arm 32 to the idling position. As any movement of the cam away from its neutral position at which the rollers 86 bear upon the neutral or dwell portion 74 occurs, the connection point 98 of the cable with the control cam moves away from the end of the tube 90 and from the rollers 102, with the result that a pull is exerted upon the cable 94 at the cam, which results in actuating of the throttle arm 32 to increase the speed of operation of the engine 28.

The parts are preferably so arranged and proportioned that a movement of the control 70, 72 to engage the drive transmission for forward drive, that is, a movement toward the position shown in FIG. 5, will produce a greater movement of the throttle arm 32 by the time the cam 64 has been moved for engagement of the rollers 86 on the transmission control arm 54 with the end part 78 of the cam than is the throttle movement which is exerted when the control member is actuated in the reverse direction toward the position illustrated in FIG. 7. Thus it will be observed that in FIG. 5 when rollers 86 engage cam part 78, the throttle 32 has been moved to a limit position in the slot 96, whereas actuation in the opposite direction to cause the rollers 86 of the transmission control arm 54 to engage the cam part 82, the pull exerted upon the cable 94 shifts the throttle arm 32 only to a mid position in the slot 96. In this way, the speed of the vehicle in reverse setting is less than the speed of the vehicle in forward setting. This may be accomplished by orientation of the point 98 relative to the rollers 102 at the neutral setting which is slightly over-center relative to the space between the rollers 102, so that pull is exerted immediately upon the cable 94 as soon as any departure from neutral setting toward forward setting of the parts occurs, whereas reverse movement entails lost play or lost motion of the cam relative to the cable before throttle-actuating operation commences. This correlation of the parts serves to produce slight acceleration through the throttle and slight gear rotation before the gears of the transmission are brought into meshing engagement by traversal of the cam surface 76 in forward movement. By this means, a "synchro-mesh" shifting of the device is obtained.

It will be apparent that the control mechanism effects conjoint and coordinated controlling of both the transmission device and the throttle. Thus the user of the device can control the drive of the vehicle through a single lever which will insure idling of the engine when the transmission is at neutral, which will insure a proper rate or time relation of acceleration through throttle movement with respect to the shifting of the transmission from neutral to forward drive position, and which will insure proper correlation of the rate at which the throttle is actuated with respect to actuation of the drive transmission to reverse setting, and will also insure that only partial throttle operation will occur in reverse setting so that the speed of engine operation is automatically modulated or held at a minimum as long as the transmission is set in reverse. It will also be observed that a push-pull type of action occurs between the throttle and the actuating rod 70, with the pulling action being exerted when the transmission is set in either operative condition and a push being exerted to restore the throttle to idling position when the rod 70 is in its neutral position. It will be apparent that other types of push-pull connections than that shown through the use of the flexible cable and the flexible tube may be utilized so that the same push-pull actuation of the throttle in correlation with the actuation of the rod 70 will occur.

One additional characteristic of the device will be noted, namely, that the extent of the movement of the control lever 72 and the actuator rod 70 in "forward" direction will determine the engine speed. Thus the parts may be so correlated that, as soon as traversal of the cam portion 76 relative to the rollers 86 occurs to actuate the transmission for forward drive movement, a partial actuation only of the throttle lever 32 will occur.

Thereafter, further actuation of the throttle lever to a limit position of forward drive will change the position of the throttle lever and increase the speed of engine operation.

It is desirable to provide the device with a "dead man's" deactivating mechanism, particularly when the device is in reverse setting. A mechanism of this character is provided, which consists of an elongated arm 104 pivoted at 106 at one end thereof to the chassis 20 and normally juxtaposed to and passing below the leading end of the cam 64 when the control cam 64 is in the neutral positon as illustrated in FIG. 9. The free end of the arm 104 is connected to a tension spring 108 which is anchored at 110 to the frame 20 or the bracket 60. In the normal position of the parts, as at neutral setting and in forward drive setting, the dead-man's arm 104 is clear of the cam 64 and is held releasably in that position by the tension spring 108. When the control is actuated toward reverse position, however, as illustrated at FIG. 7, the leading end of the cam engages the dead-man's arm 104 and depresses the same to the dotted line position shown in FIG. 9, against the action of the spring 108. The strength of the spring 108 will be sufficient to insure return of the dead-man's arm 104 and the cam 64 and transmission control member 54 to normal position shown in FIG. 9, as soon as the operator releases the control lever 72. Consequently, reverse operation of the device will stop as soon as the operator releases the operating lever 72 from its reverse position. In this way, danger to the operator in the event of an accident while the device is in reverse setting is minimized, since "reverse" setting is maintained only while lever 72 is held manually against the action of spring 108, tending to move the cam 64 to the normal or "neutral" setting of FIG. 4.

The shape or configuration of the cam to provide a neutral or dwell portion 74 thereof, which is of substantial circumferential extent, is important in the functioning of the device. Thus, if the operator should inadvertently swing the control lever 72 from a setting in either forward or reverse drive through and past the neutral position to the opposite setting without pause in such movement, there will nevertheless occur an interval of time at which the transmission is at neutral setting, that is, the period of time during which the rollers 86 of the transmission control rod 54 are in engagement with the neutral portion 74 of the cam. This insures against injury to the transmission which might occur upon rapid reversal of setting thereof.

While the preferred embodiment of the invention has been illustrated and described, it will be understood that changes in the construction may be made within the scope of the appended claims without departing from the spirit of the invention.

I claim:

1. A control device for controlling an engine driven device having a throttle shiftable between idling and accelerating positions and a reversible drive transmission device having a control part shiftable between "forward," "neutral" and "reverse" positions, comprising
   a control member shiftable on said engine driven device for positioning said control part,
   a manually operable controller shiftable on said engine driven device, for selectively actuating said control member,
   means actuated by said controller and connected to said throttle to position said throttle in idling position while said control part is in neutral position and to advance said throttle to an accelerating position when said control part is shifted clear of neutral position,
   said control member constituting a cam plate rotatable on an axis substantially parallel to the path of movement of said transmission control part and including segments extending in angularly related planes, and
   a cam follower carried by said transmission control part and straddling said cam plate.

2. A control device for controlling an engine driven device having a throttle shiftable between idling and accelerating positions and a reversible drive transmission device having a control part shiftable between "forward," "neutral" and "reverse" positions, comprising
   a control member shiftable on said engine driven device for positioning said control part,
   a manually operable controller shiftable on said engine driven device for selectively actuating said control member,
   means actuated by said controller and connected to said throttle to position said throttle in idling position while said control part is in neutral position and to advance said throttle to an accelerating position when said control part is shifted clear of neutral position,
   said last named means advancing said throttle to a greater extent when said controller is actuated for "forward" transmission operation than for "reverse" transmission operation,
   said control member constituting a cam plate rotatable on an axis substantially parallel to the path of movement of said transmission control part and including segments extending in angularly related planes, and
   a bifurcated cam follower including spaced cage portions and a roller carried by each cage portion,
   said rollers being adapted to engage opposite surfaces of said cam plate.

3. A control device for controlling an engine driven device having a throttle shiftable between idling and accelerating positions and a reversible drive transmission device having a control part shiftable between "forward," "neutral" and "reverse" positions, comprising
   a cam member rotatable on said engine driven device on an axis substantially parallel to the path of movement of said transmission control part and having a plurality of spaced parts normal to said axis and intervening angular parts,
   a cam follower carried by said control part and engaging said cam member,
   a manual controller shiftable between selected positions relative to said engine driven device to rotate said cam, and
   throttle actuating means including a part carried by said cam member and a guide carried by said engine driven device and positioned adjacent the connection of said throttle part and said cam when said cam is in "neutral" setting,
   said throttle actuating means advancing said throttle to accelerating position when said cam is rotated to cause said cam follower to traverse said cam from one cam part normal to said axis to another cam part normal to said axis.

4. The combination defined in claim 3, wherein
   said throttle actuating means includes a tube anchored at its ends relative to said engine driven device and terminating adjacent to said throttle and cam member, respectively, and
   an elongated cable connected at one end to said cam member spaced from its axis of rotation and connected at its opposite end to said throttle,
   said cable engaging said guide adjacent to and externally of one end of said tube.

5. The combination defined in claim 3, wherein
   said cam member constitutes a plate bent substantially radially thereof to define said spaced normal parts and intervening angular parts, and
   said cam follower straddles said plate and includes cage members mounting rollers engageable with opposite surfaces of said cam plate.

6. The combination defined in claim 3, and
   a spring-loaded member interposed in the path of movement of said cam member between "neutral" and "reverse" positions and operable to shift said cam to "neutral" position upon release of said manual controller while in "reverse" setting.

References Cited by the Examiner

UNITED STATES PATENTS

| | | | |
|---|---|---|---|
| 2,387,370 | 10/1945 | Wallace et al. | 74—472 |
| 2,561,949 | 7/1951 | Reese | 192—.096 |
| 2,587,343 | 2/1952 | Lind | 192—.096 |
| 2,588,649 | 3/1952 | Morse | 192—.096 X |
| 2,674,355 | 4/1954 | Keel | 192—.096 |
| 3,127,785 | 4/1964 | Morse et al. | 74—472 |

A. HARRY LEVY, *Primary Examiner.*

BENJAMIN HERSH, *Examiner.*

E. E. PORTER, *Assistant Examiner.*